United States Patent [19]

Das et al.

[11] Patent Number: 4,522,958
[45] Date of Patent: Jun. 11, 1985

[54] HIGH-SOLIDS COATING COMPOSITION FOR IMPROVED RHEOLOGY CONTROL CONTAINING CHEMICALLY MODIFIED INORGANIC MICROPARTICLES

[75] Inventors: Suryya K. Das, Pittsburgh; William G. Boberski, Gibsonia; Paul P. Greigger, Allison Park; James E. Jones, Lower Burrell; Raymond F. Schappert, Glenshaw; Jerome A. Seiner, Pittsburgh, all of Pa.

[73] Assignee: PPG Industries, Inc., Pittsburgh, Pa.

[21] Appl. No.: 529,421

[22] Filed: Sep. 6, 1983

[51] Int. Cl.$^3$ ............................................. C08K 9/06
[52] U.S. Cl. .................................... 523/212; 428/418; 428/423.1; 428/458; 428/480; 428/482; 523/216; 523/220; 523/456; 523/466; 523/511; 523/521; 524/561; 524/562; 524/563; 524/564; 524/566; 524/441; 524/493; 524/590; 524/601; 524/606; 524/502; 524/558
[58] Field of Search ............... 523/212, 216, 220, 456, 523/466, 521, 511; 524/502, 560, 561, 562, 566, 558, 559, 563, 564, 590, 601, 606; 428/418, 482, 480, 458

[56] References Cited

U.S. PATENT DOCUMENTS

| | | | |
|---|---|---|---|
| 2,801,185 | 7/1957 | Iler | 106/288 |
| 2,801,186 | 7/1957 | Alexander et al. | 106/288 |
| 3,131,148 | 4/1964 | Taulli | 252/28 |
| 3,178,321 | 4/1965 | Satterfield | 148/13.1 |
| 3,547,663 | 12/1970 | Bott | 106/36 |
| 3,574,135 | 4/1971 | Sampson et al. | 253/317 |
| 3,689,300 | 9/1972 | Bunger et al. | 106/287 |
| 3,699,049 | 10/1972 | Pluta et al. | 252/309 |
| 3,855,145 | 12/1974 | Vossos | 252/309 |
| 3,948,799 | 4/1976 | Schaefer et al. | 252/309 |
| 4,238,387 | 12/1980 | Antonelli et al. | 260/42.29 |
| 4,411,951 | 10/1983 | Barsotti | 428/328 |

FOREIGN PATENT DOCUMENTS 0059321 9/1982 European Pat. Off. .
56-141323 11/1981 Japan .
56-155227 12/1981 Japan .

OTHER PUBLICATIONS

CAB-O-SIL Technical Data, "CAB-O-SIL Fumed Silica for Rheology Control of High Solids Coatings", by Dennis Miller, Cabot Corporation, Oct. 1981.
Technical Service Laboratory Report, CAB-O-Sil as a Transparent Extender in Automotive Enamels, pp. 1-3, Godfrey L. Cabot, Inc., Jan. 1955.
Progress in Organic Coatings, 10, (1982), pp. 91-118, "Amorphous Synthetic Silica Products in Powder Form. Part 2. Applications [1]", Horst Ferch.
Journal of Colloid and Interface Science, vol. 26, pp. 62-69, (1968), "Controlled Growth of Monodisperse Silica Spheres in the Micron Size Range", by Stober et al.
Journal of Colloid and Interface Science, vol. 81, No. 2, pp. 354-368, (1981), "Preparation and Characterization of Spherical Monodisperse Silica Dispersions in Nonaqueous Solvents", Van Helden et al.
Journal of Colloid and Interface Science, vol. 79, pp. 289-294, (1981), "Preparation of Sterically Stabilized Silica Dispersions in Nonaqueous Media", by H. De Hek et al.
"CAB-O-SIL In Coatings", pp. 4 and 11, a trade bulletin published by CABOT Corporation on or before Mar. 5, 1973.
Journal of Colloid and Interface Science, vol. 84, No. 2, pp. 409-422, (1981), "Interactions in Mixtures of Colloidal Silica Spheres and Polystyrene Molecules in Cyclohexane", De Hek et al.

Primary Examiner—Lewis T. Jacobs
Attorney, Agent, or Firm—Thomas M. Breininger

[57] ABSTRACT

Disclosed is an essentially solvent-based, organic, high-solids coating composition containing (A) a film-forming binder system containing a crosslinkable resin having a weight average molecular weight of from about 500 to about 10,000; (B) substantially colorless, substantially inorganic microparticles stably dispersed in the coating composition; and (C) a solvent system for the crosslinkable resin. The inorganic microparticles prior to incorporation in the coating composition range in size from about 1 to about 150 nanometers and are in the form of a sol of the microparticles in which carbon-containing molecules are chemically bonded to the inorganic microparticles at the surface of the microparticles.

30 Claims, No Drawings

HIGH-SOLIDS COATING COMPOSITION FOR IMPROVED RHEOLOGY CONTROL CONTAINING CHEMICALLY MODIFIED INORGANIC MICROPARTICLES

BACKGROUND OF THE INVENTION

As the coatings industry, especially the automotive coatings industry, attempts to move to the use of coating compositions having a high content of essentially nonvolatile solids (commonly called high-solids coating compositions) the problems of providing coating compositions having a high solids content which still provide desirable performance characteristics have become increasingly challenging.

One problem arises from the tendency of high-solids thermosetting compositions to sag on a substantially nonhorizontal substrate during the heat curing operation. Such sagging adversely affects the appearance properties of both pigmented and unpigmented cured films. However, the adverse effects of sagging on appearance properties of cured films are particularly severe when the high-solids coating compositions contain metallic-flake pigments. Additionally, whereas some conventional additives for rheology control may provide some measure of sag control, other appearance problems of the cured films to a large degree are not improved by the addition of conventional rheology modifiers. For example, control of pigment orientation in metallic high-solids coatings so as to provide an acceptable "brightness of face" or "lightness of face" in the cured films along with a desirable two tone appearance of the coated substrate as it is viewed from different angles to a direction normal to the surface is particularly difficult where high-solids coating compositions are utilized. As used herein control of the aforementioned two appearance properties collectively will be referred to as "pattern control". Moreover, some materials such as pyrogenic silicas which have been advocated for alleviating sag control problems in high-solids coating applications, while providing a measure of sag control, do not allow for both an adequate degree of pattern control and an adequate degree of gloss of the cured films prepared from coating compositions containing pyrogenic silicas. That is, when employed at a level which will provide a reasonable degree of pattern control, pyrogenic silicas tend to greatly lower the degree of gloss of the cured film. This performance disadvantage of materials like pyrogenic silicas is especially important considering the high gloss requirements for coating compositions for use in automotive applications.

Additionally it is important that a high-solids coating composition have an acceptable degree of storage stability. That is, the performance characteristics of the coating compositions should not be seriously affected by storage of the compositions for reasonable periods of time between preparation of the compositions and use, under various storage conditions which can exist where such compositions are customarily employed. Applicants' patent application titled HIGH-SOLIDS COATING COMPOSITION FOR IMPROVED RHEOLOGY CONTROL CONTAINING INORGANIC MICROPARTICLES filed even date herewith is directed to a high-solids coating composition containing substantially colorless, substantially inorganic microparticles ranging in size from about 1 to about 150 nanometers in the form of a sol of the microparticles in which the surface of the inorganic microparticles is essentially free of carbon-containing molecules chemically bonded to the inorganic microparticles. While high solids coating compositions described herein exhibit a number of advantages, the high-solids compositions of the present invention tend to have a higher degree of storage stability especially at somewhat elevated storage temperatures.

It has now been found that alleviation of the above problems can be obtained by the incorporation in a high solids coating composition of substantially colorless, substantially inorganic microparticles ranging in size from about 1 to about 150 nanometers in the form of a sol of the microparticles in which carbon-containing molecules are chemically bonded to the surface of the inorganic microparticles.

SUMMARY OF THE PRESENT INVENTION

The present invention provides for an essentially solvent-based, organic, high-solids coating composition which is conventionally sprayable at high solids comprising:

(A) a film-forming binder system containing a crosslinkable resin having a weight average molecular weight of from about 500 to about 10,000, and optionally a crosslinking agent for the crosslinkable resin;

(B) substantially colorless, substantially inorganic microparticles stably dispersed in the coating composition, the microparticles prior to incorporation in the coating composition ranging in size from about 1 to about 150 nanometers and in the form of a sol of the microparticles in which carbon-containing molecules are chemically bonded to the surface of the inorganic microparticles; and (C) a solvent system for the crosslinkable resin and the optional crosslinking agent.

DETAILED DESCRIPTION OF THE INVENTION

The binder system of a coating composition of the invention contains a crosslinkable resin having a weight average molecular weight of from about 500 to about 10,000. The crosslinkable resin may be any crosslinkable resin suitable for use in an essentially solvent-based, organic, high-solids coating composition. Often such crosslinkable resins are referred to as "thermosetting resins". As used herein, the term "crosslinkable resin" is intended to include not only those resins capable of being crosslinked upon application of heat but also those resins which are capable of being crosslinked without the application of heat. Examples of such crosslinkable resins include the generally known thermosetting acrylics, aminoplasts, urethanes, polyesters, and polyamides. These resins, when desired, may also contain functional groups characteristic of more than one class, as for example, polyester amides, uralkyds, urethane acrylates, urethane amide acrylates, etc.

Acrylic resins refer to the generally known addition polymers and copolymers of acrylic and methacrylic acids and their ester derivatives, acrylamide and methacrylamide, and acrylonitrile and methacrylonitrile. Examples of ester derivatives of acrylic and methacrylic acids include such alkyl acrylates and alkyl methacrylates as ethyl, methyl, propyl, butyl, hexyl, ethylhexyl and lauryl acrylates and methacrylates, as well as similar esters, having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxyethyl methacrylate, 2-hydroxypropyl methacrylate, 3-hydroxypropyl-4-hydroxybutyl methacrylate, and mixtures of such esters having up to about 5 carbon atoms in the alkyl group. In some instances, corresponding esters of other unsaturated acids, for example, ethacrylic acid, crotonic acid, and other similar acids having up to about 6 carbon atoms can be employed. Where desired, various other ethylenically unsaturated monomers can be utilized in the preparation of acrylic resins examples of which include: vinyl aromatic hydrocarbons optionally bearing halo substituents such as styrene, alpha-methyl styrene, vinyl toluene, alpha-chlorostyrene, alpha-bromostyrene, and para-fluorostyrene; nonaromatic monoolefinic and diolefinic hydrocarbons optionally bearing halo substituents such as isobutylene, 2,3-dimethyl-1-hexene, 1,3-butadiene, chloroethylene, chlorobutadiene and the like; and esters of organic and inorganic acids such as vinyl acetate, vinyl propionate, ispropenyl acetate, vinyl chloride, allyl chloride, vinyl alpha-chloroacetate, dimethyl maleate and the like.

The above polymerizable monomers are mentioned as representative of the $CH_2=C<$ containing monomers which may be employed; but essentially any copolymerizable monomer can be used.

Aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoguanimine. Preferred aminoplast resins include the etherified (i.e., alkylated) products obtained from the reaction of alcohols and formaldehyde with urea, melamine, or benzoguaniaine. Examples of suitable alcohols for preparing these etherified products include: methanol, ethanol, propanol, butanol, hexanol, benzylalcohol, cyclohexanol, 3-chloropropanol, and ethoxyethanol.

Urethane resins refer to the generally known thermosetting urethane resins prepared from organic polyisocyanates and organic compounds containing active hydrogen atoms as found for example in hydroxyl, and amino moieties. Some examples of urethane resins typically utilized in one-pack coating compositions include: the isocyanate-modified alkyd resins sometimes referred to as "uralkyds"; the isocyanate modified drying oils commonly referred to as "urethane oils" which cure with a drier in the presence of oxygen in air; and isocyanate-terminated prepolymers typically prepared from an excess of one or more organic polyisocyanates and one or more polyols including, for example, simple diols, triols and higher alcohols, polyester polyols and polyether polyols. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst (e.g., an organotin salt such as dibutyltin dilaurate or an organic amine such as triethylamine or 1,4-diazobicyclo-(2:2:2) octane). The active hydrogen-containing substance in the second pack typically is a polyester polyol, a polyether polyol, or an acrylic polyol known for use in such two-pack urethane resin systems. Many coating compositions based on urethanes (and their preparation) are described extensively in Chapter X Coatings, pages 453–607 of *Polyurethanes: Chemistry and Technology, Part II* by H. Saunders and K. C. Frisch, Interscience Publishers (N.Y., 1964).

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol; 1,6-hexanediol; 1,4-cyclohexanediol; 1,4-cyclohexanedimethanol; 1,2-bis(hydroxyethyl)cyclohexane; and 2,2-dimethyl-3-hydroxypropyl-2,2-dimethyl-3-hydroxypropionate. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; maleic acid; glutaric acid; malonic acid; pimelic acid; suberic acid; 2-2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the term "polycarboxylic acid." In addition, certain substances which react in a manner similar to acids to form polyesters are also useful. Such substances include lactones such as caprolactone, propylolactone and methyl caprolactone, and hydroxy acids such as hydroxy caproic acid and dimethylol propionic acid. If a triol or higher hydric alcohol is used, a monocarboxylic acid, such as acetic acid and benzoic acid may be used in the preparation of the polyester resin. Moreover, polyesters are intended to include polyesters modified with fatty acids or glyceride oils of fatty acids (i.e., conventional alkyd resins). Alkyd resins typically are produced by reacting the polyhydric alcohols, polycarboxylic acids, and fatty acids derived from drying, semi-drying, and non-drying oils in various proportions in the presence of a catalyst such as litharge, sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid, elaeostearic acid, and clupanodonic acid.

Epoxy resins, often referred to simply as "epoxies", are generally known and refer to compounds or mixtures of compounds containing more than one 1,2-epoxy group of the formula

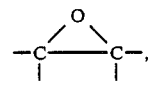

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate.

Many additional examples of epoxy resins are described in the *Handbook of Epoxy Resins,* Henry Lee and Kris Neville, 1967, McGraw Hill Book Company.

When desired, generally known crosslinking agents can be incorporated in a composition of the invention particularly when the crosslinkable resin comprises a thermosetting resin containing active hydrogen atoms.

As will be appreciated by one skilled in the art, the choice of crosslinking agent depends on various factors such as compatibility with the film-forming resin, the particular type of functional groups on the film-forming resin and the like. The crosslinking agent may be used to crosslink the film-forming resin either by condensation or addition or both. When for example the thermosetting reactants can be crosslinked in the presence of moisture or when the thermosetting reactants include monomers having complementary groups capable of entering into crosslinking reactions, the crosslinking agent may be omitted if desired.

Representative examples of crosslinking agents include blocked and/or unblocked diisocyanates, diepoxides, aminoplasts and phenoplasts. When aminoplast resins are employed as crosslinking agents, particularly suitable are the melamine-formaldehyde condensates in which a substantial proportion of the methylol groups have been etherified by reaction with a monohydric alcohol such as those set forth previously in the description of aminoplast resins suitable for use as crosslinkable resins in compositions of the invention.

The term "solvent system" as used herein, for example in the phrase "solvent system for the crosslinkable resin and optional crosslinking agent", is employed in a broad sense and is intended to include true solvents as well as liquid diluents for the crosslinkable resin and optional crosslinking agent which are not true solvents for these components. The solvent system generally is organic. It may be a single compound or a mixture of compounds. When the solvent system comprises both water and an organic portion, the components are usually miscible in the proportions employed. The relationship between the solvent system and the crosslinkable resin depends upon the absolute and relative natures of these materials and upon the relative amounts used. Such factors as solubility, miscibility, polarity, hydrophilicity, hydrophobicity, lyophilicity and lyophobicity are some of the factors which may be considered. Illustrative of suitable components of the solvent system which may be employed are alcohols such as lower alkanols containing 1 to 8 carbon atoms including methanol, ethanol, propanol, isopropanol, butanol, sec-butyl alcohol, tert-butyl alcohol, amyl alcohol, hexyl alcohol and 2-ethylhexyl alcohol; ethers and ether alcohols such as ethylene glycol monoethyl ether, ethylene glycol monobutyl ether, ethylene glycol dibutyl ether, propylene glycol monomethyl ether, diethylene glycol monobutyl ether, diethylene glycol dibutyl ether, dipropylene glycol monoethyl ether, and dipropylene glycol monobutyl ether; ketones such as methyl ethyl ketone, methyl isobutyl ketone, methyl amyl ketone and methyl N-butyl ketone; esters such as butyl acetate, 2-ethoxyethyl acetate and 2-ethylhexyl acetate; aliphatic and alicyclic hydrocarbons such as the various petroleum naphthas and cyclohexane; aromatic hydrocarbons such as toluene and xylene; and water.

Ordinarily a composition of the invention also contains a pigment. Examples of opacifying pigments include titanium dioxide (rutile or anatase), zinc oxide, zirconium oxide, zinc sulfide, and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow and toluidine red. Examples of reactive pigments include silicate-treated barium metaborate, strontium chromate and lead chromate. Examples of extender pigments include Pigmentary silica, barytes, calcium carbonate, barium sulfate, talc, aluminum silicates, sodium aluminum silicates, potassium aluminum silicates and magnesium silicates. Metallic pigments include metallic powders and metallic flakes. Examples of metallic powders include aluminum powder, copper powder, bronze powder and zinc dust. Examples of metallic flakes include aluminum flakes, nickel flakes, copper flakes, bronze flakes, brass flakes and chromium flakes. A single pigment may be used or mixtures of pigments may be employed. It is preferred that at least a portion of the pigment particles be metallic flakes. The metallic flakes usually comprise aluminum flakes.

The principles respecting the formation of solutions, dispersions, pseudodispersions, and emulsions of film-forming resins are generally known in the art. Any of these systems may be utilized in the compositions of the invention.

In addition to the above components the compositions of the invention may contain optional ingredients which may be employed in their customary amounts for their customary purposes provided they do not seriously interfere with good coatings practice. Examples of these optional ingredients include various fillers; plasticizers; antioxidants; mildewcides and fungicides; surfactants; various catalysts to promote drying or curing; resinous pigment dispersants or grinding vehicles; various flow control agents including, for example, thixotropes and additives for sag resistance and/or pigment orientation based on organic polymer microparticles which are insoluble in the solvent system and which have a diameter in the range of from about 0.01 to about 40 microns (sometimes referred to as microgels) described for example in U.S. Pat. Nos. 4,025,474; 4,055,607; 4,075,141; 4,115,472; 4,147,688; 4,180,489; 4,242,384; 4,268,547; 4,220,679; and 4,290,932 the disclosures of which are hereby incorporated by reference; and other such formulating additives.

A coating composition of the invention contains substantially colorless, substantially inorganic microparticles dispersed in the coating composition. These inorganic microparticles, prior to incorporation in the coating composition, have an average diameter in the range of from about 1 to about 150 nanometers (i.e., from about 1 to about 150 millimicrons), preferably from about 1 to about 100 nanometers, and most preferably from about 3.5 to about 50 nanometers. The smaller inorganic microparticles tend to be more effective in the sense that a similar degree of pattern control from a high solids coating composition can be obtained utilizing less of the smaller inorganic microparticles than the larger inorganic microparticles. The substantially inorganic microparticles suitable for a coating composition of the present invention, prior to incorporation in the coating composition, are in the form of a sol, preferably an organosol, of the microparticles in which the surface of the inorganic microparticles has incorporated therein carbon-containing molecules which are chemically bonded to the inorganic microparticles as through covalent or ionic bonds. A particularly effective type of substantially inorganic microparticles for compositions of the invention includes a variety of silica sols of silica particles of particle size within the aforesaid range and having surface modification as described above.

The microparticles suitable for compositions of the present invention are substantially inorganic. The substantially inorganic microparticles can, for example, comprise a core of essentially a single inorganic oxide such as silica or alumina, or an inorganic oxide of one type on which is deposited an inorganic oxide of another type. However, the inorganic microparticles suitable for coating compositions of the present invention ordinarily are essentially colorless so as not to seriously interfere with the light transmissive characteristics of the coating compositions when unpigmented. It is to be understood that although the substantially inorganic microparticles may be discrete or associated through physical and/or chemical means into aggregates, although discrete particles are preferred, and although a given sample of the microparticles generally will have particles falling into a range of particle sizes, the substantially inorganic microparticles will have an average diameter in the range of from about 1 to about 150 nanometers. The substantially inorganic microparticles used as starting material for incorporation in the coating composition should be in a form suitable for dispersion in the coating composition whereby after dispersing, the substantially inorganic microparticles remain stably dispersed for a period of time at least sufficient so as not to prevent the use of the coating composition for its intended purpose. For example, a coating composition containing dispersed, inorganic microparticles, depending on the size of the inorganic microparticles and the nature of the other components employed in preparing the coating composition, in which the dispersed inorganic microparticles tend to settle over a period of time, but which can be redispersed as for example utilizing conventional paint mixing techniques, is considered to fall within the scope of the present invention.

A particularly desirable class of substantially inorganic microparticles for compositions of the present invention includes sols of a wide variety of small-particle, amorphous silicas having an average particle diameter ranging from about 1 to about 150 nanometers (nm), preferably from about 1 to about 100 nm, and most preferably from about 3.5 to about 50 nm which silicas have been surface modified during and/or after the particles are initially formed. Such silicas can be prepared by a variety of techniques in a variety of forms examples of which include aquasols, organosols, and mixed sols. As used herein the term "mixed sols" is intended to include those dispersions of amorphous silica in which the dispersing medium comprises both an organic liquid and water. Such small particle amorphous silicas are readily available, are essentially colorless, and have refractive indices which make them suitable for combination with a variety of crosslinkable resins and solvent systems so as to form substantially colorless transparent coating compositions when the coating compositions are free of dyes and pigments. Moreover silicas of appropriate particle size and which have various degrees of hydrophobicity, hydrophilicity, organophobicity and organophilicity may be employed depending on compatibility with the particular crosslinkable resin and solvent system utilized in the coating composition.

The silicas ordinarily used in compositions of the invention include common amorphous forms having ultimate particles of silica which at least prior to incorporating in the coating composition are essentially unaggregated the surface of which silicas may contain in addition to the chemically bonded carbon-containing moieties, such groups as anhydrous $SiO_2$ groups, SiOH groups, various ionic groups physically associated or chemically bonded within the surface of the silica, adsorbed organic groups, and combinations thereof depending on the particular characteristics of the silica desired. However, the silicas utilized in the present invention have surfaces which contain carbon-containing molecules chemically bonded to the inorganic microparticles. Preferably, such chemical modification of the silica surface renders the particle essentially hydrophobic and essentially organophilic. The silicas can be in the form of generally known organosols, mixed sols, hydrosols, and the like. However in the high solids, organic solvent based coating compositions of the invention, it is typically preferred to employ silica organosols of the types in which the particles of silica are dispersed in an alcoholic medium such as a monohydric alcohol, a polyol, or a mixture thereof.

For example in one preferred embodiment of the invention the inorganic microparticles consist of silica in the form of a colloidal dispersion of the silica in an alcohol such as a lower monohydric alcohol examples of which include methanol, ethanol, n-propanol, isopropanol, n-butanol, and ether-containing alcohols such as ethylene glycol monomethyl ether, ethylene glycol monoethyl ether, diethylene glycol monomethyl ether, propylene glycol monomethyl ether, dipropylene glycol monomethyl ether, dipropylene glycol monoethyl ether, propylene glycol monobutyl ether, and dipropylene glycol monobutyl ether. Techniques for preparing such dispersions of colloidal silica in alcohols, as can be seen infra, are known. Such dispersions are often prepared by controlled addition of an aqueous silica sol to the alcohol while simultaneously removing water for example by distillation at a temperature at least sufficient to effect substantial chemical reaction between the hydroxyl groups of the alcohol and silanol groups of the colloidal silica occurs. The products are sometimes referred to as alcosols and contain silica particles having chemically modified surfaces.

The following description is intended to be additionally illustrative of some of the types of silica which can serve as inorganic microparticles having an average particle diameter ranging from about 1 to about 150 nm, preferably from about 1 to about 100 nm, and most preferably from about 3.5 to about 50 nm, for the preparation of compositions of the invention. The preparation and properties of these silicas are generally known. The silica particles prior to chemical modification of the surface generally may have a surface area ranging from about 20 to about 3000 square meters per gram ($m^2/g$), preferably from about 30 to about 3000 $m^2/g$, and most preferably from about 60 to about 850 $m^2/g$ and prior to incorporation into the coating composition may be in the form of dense, discrete ultimate particles or aggregates of associated particles although silicas having discrete ultimate particles are preferred. In either case, the average diameter of the particles of silica (taken as approximate spheres) will fall within the ranges previously set forth.

One common method for making silicas having an average particle size ranging from about 1 to about 150 nm employs preparation of the silica in an aqueous medium to produce a hydrosol of silica. Silica hydrosols may be prepared for example by partially neutralizing an aqueous solution of an alkali metal silicate, ordinarily sodium silicate, with acid to a pH typically of about 8 to about 9 such that the resulting sodium content of the solution ordinarily is less than about 1 percent by weight based on sodium oxide. A somewhat different, less common approach involves reacting the aqueous sodium silicate solution with sufficient acid to make an acidic sol and precipitating the sodium salt in a strongly acidic medium. This alternate approach makes use of the property that polysilic acid is temporarily stable at about a pH of 2, and if the sodium salt of the acid used for neutralizing the sodium silicate is sufficiently insoluble, it can be precipitated and separated. Once the salt is separated from the acidic sol, the sol can be alkalinized to grow colloidal particles and stabilize the product or can be employed in other known processes of growing silica particles to the desired size. Typically a heating step is involved in these processes since temperature is a well known variable for controlling the particle size of the silica product. Representative preparations of silica aquasols are contained in the following literature which is hereby incorporated by reference: U.S. Pat. Nos. 2,244,325; 2,375,738; 2,574,902; 2,577,484; 2,577,485; 2,750,345; 3,012,973; 3,440,174; 3,538,015; 3,673,104; 3,714,064 and THE CHEMISTRY OF SILICA by Ralph K. Iler, copyright 1979, pages 172-176 and 331-343. Aquasols of silica can be used as starting materials for the preparation of surface modified silicas.

A method for preparing silica sols having uniform spherical silica particles of controlled particle size by hydrolyzing a lower alkoxysilane in an alcohol medium containing suitable amounts of water and ammonia has been described by Stöber et al in the JOURNAL OF COLLOID AND INTERFACE SCIENCE, Volume 26, pages 62-69 (1968) the disclosure of which is hereby incorporated by reference. Such sols likewise can be used as starting materials for preparation of the surface modified silicas. In another embodiment of the invention the substantially inorganic microparticles comprise silica prepared from the hydrolysis of a compound selected from a tetraalkylorthosilicate, an alkoxypolysiloxane, an alkylalkoxysilane or a mixture thereof in the presence of a base in a water-alcohol medium of pH greater than 7.0. Typically a tetraalkyl orthosilicate in combination with an alkylalkoxysilane has been employed in preparing the inorganic microparticles for this embodiment. For example, octyltriethoxysilane and tetraethoxysilane (TEOS) in a ratio by weight of octyltriethoxysilane to tetraethoxysilane ranging from 1:99 to 1:4 has been employed to prepare silica microparticles having chemically modified surfaces for compositions of the present invention. It has been found for example that the higher the ratio by weight of octyltriethoxysilane to tetraethoxysilane employed, the more hydrophobic and organophilic are the resulting silica microparticles. Examples of other tetraalkylorthosilicates and alkylalkoxysilanes which can be used to prepare the silica microparticles for this embodiment include tetramethoxysilane, tetrapropoxysilane, hexyltriethoxysilane, propyltriethoxysilane, decyltriethoxysilane, methyltriethoxysilane, dimethyldimethoxysilane, dimethyldiethoxysilane and mixtures thereof. However it is preferred that when an alkylalkoxysilane containing only 1 to 3 carbon atoms in the alkyl group is employed, that an alkylalkoxysilane containing greater than 3 carbon atoms in the alkyl group also be employed. As indicated previously, alkoxypolysiloxanes may be utilized in the preparation of the silica microparticles for this embodiment of the invention. Examples of alkoxypolysiloxanes include hexaethoxy disiloxane, octaethoxy trisiloxane, and SILBOND-40, a hydrolyzed and condensed tetraethoxysilane available from Stauffer Chemical Company.

Silica organosols are especially preferred for the essentially solvent based, high solids compositions of the invention. The silanol (SiOH) surface of silica particles which have not been modified utilizing various organic compounds tends to limit their dispersibility in organic media to organic liquids such as lower alcohols, amides and ketones. However silicas containing surface modification by various organic compounds can be dispersed to form organosols in a variety of organic liquids. Such surface modification of the silica particles can be effected, for example, by treatment with various organic compounds which can be incorporated in the surface of the silica essentially through chemical means as for example by treatment with monohydric alcohols, polyols, and mixtures thereof, under conditions such that silanol groups of the silica particles chemically bond with hydroxyl groups of the monohydric alcohols and/or polyols. Still another way to chemically modify the surface of a silica particle to render it more organophilic is to react the surface of the silica with alkyl chlorosilanes, especially alkyl chlorosilanes containing more than 3 carbon atoms in the alkyl group. A variety of ways are known in the art for chemically modifying the surface of silica to make the silica more compatible with organic liquids. Representative preparations of silica organosols and mixed sols having silica microparticles with chemically modified surfaces can be found in the following literature, those portions describing the preparation of sols of silica particles the surfaces of which are essentially modified by carbon-containing molecules chemically bonded to the inorganic microparticles as through covalent and ionic bonds are hereby incorporated by reference: U.S. Pat. Nos. 2,801,185; 2,801,186; 2,692,863; 3,629,139; 2,739,078; 2,974,105; 3,336,235; 2,786,042; and THE CHEMISTRY OF SILICA by Ralph K. Iler, copyright 1979, pages 412–415.

A wide variety of silicas in the form of hydrosols and organosols may be obtained for example under the trade names of LUDOX from E. I. Du Pont De Nemours and Company, NALCOAG from Nalco Chemical Company, NYACOL from Nyacol, Inc., and SNOWTEX from Nissan Chemical Industries, Ltd.

The amounts of the materials in the coating composition including the substantially inorganic microparticles can vary widely. Generally the crosslinkable resin constitutes from about 15 percent to about 95 percent by weight, typically from about 35 percent to about 65 percent by weight, of the coating composition. Generally the amount of substantially inorganic microparticles can range from about 1 percent to about 20 percent by weight, typically from about 2 percent to about 12 percent by weight, based on the sum of the weights of the crosslinkable resin, optional crosslinking agent, and inorganic microparticles.

The amount of solvents and/or diluents constituting the solvent system for the crosslinkable resin and optional crosslinking agent also may vary widely. Generally the total amount of solvents and/or diluents may range from about 0 to about 60 percent by weight, typically from about 25 to about 55 percent by weight, of the coating composition.

The amounts of pigment particles when present in the coating composition is likewise subject to wide variation. Generally the pigment is present in an amount ranging from about 1 to about 60 percent by weight, typically from about 2 to about 40 percent by weight, based on the sum of the weights of the film-forming resin and the substantially inorganic microparticles. When metallic flakes are employed as pigment in the coating composition, they generally are present in the range of from about 1 to about 20 percent by weight, typically from about 2 to about 12 percent by weight, based on the sum of the weights of the crosslinkable resin and the substantially inorganic microparticles present in the coating composition.

Compositions of the invention can be used for example to coat a wide variety of substrates such as metals, wood, glass, cloth, plastics, fiberglass, foams and the like as well as over primers. The composition can be applied to the substrate using any application technique known in the art such as roll coating, curtain coating, dip coating, doctor blade coating, spraying and the like although spraying is most often employed.

The coating compositions can be cured in a variety of ways, typically at temperatures in the range of from about 20° C. to about 260° C. Some of the crosslinkable resins such as air-curable alkyds for example may be cured by exposure to the oxygen in air. Many of the coating compositions contain a crosslinking agent. When a crosslinking agent is present, the coating compositions are usually cured by the application of heat. Although a curing temperature may vary widely it is typically in the range of about 80° Celsius (C.) to about 150° C. Similarly, curing times may be subject to wide variation, but typically range from about 10 minutes to about 45 minutes. Particularly when heat curing is employed, it is sometimes desirable to allow the coating composition to flash at ambient temperature for up to about 30 minutes, typically up to about 5 minutes, before curing.

Compositions of the invention provide a number of advantages. By incorporating the inorganic microparticles in the composition, the amount of sagging of the coating compositions on a verticle substrate during heating can be substantially reduced or even eliminated often without the use of known organic microgels. Moreover, this advantage is especially important since sag control can be an especially serious problem in curing a high-solids coating composition. As used herein, the term "high solids coating composition" is intended to include those coating compositions having a total solids content of at least about 40 percent by weight, preferably at least about 50 percent by weight, based on the total weight of the coating composition and which can be applied to the substrate by conventional spraying techniques. The solids are understood to include the essentially nonvolatile components of the coating composition including, for example, crosslinkable resin, inorganic microparticles and pigment particles. It is to be understood that the optional crosslinking agents, examples of which have been described above, are intended to be included for the purpose of the determination of the solids content of the coating composition.

Additionally, when the inorganic microparticles are incorporated in a high gloss coating composition, the composition surprisingly can be cured to a high gloss film without the occurrence of substantial flattening effects (i.e., substantial gloss reduction) which certain particulate silicas which have previously been used in coating compositions provide. This is important for example where high gloss coatings are desired as in automotive coatings applications. Equally important, where metallic flakes are employed as pigment in the coating composition, the incorporation of the inorganic microparticles provides excellent control of the pigment orientation in the cured film such that the dried or cured coating exhibits a high degree of pattern control as evidenced by excellent two tone appearance when viewed at different angles to a direction normal to the coated surface and excellent metallic brightness (sometimes referred to as brightness of face or lightness of face) when viewed from a direction essentially normal to the coated substrate. Moreover, this high degree of pattern control can be achieved utilizing a composition of the invention without the necessity of using known organic polymer microgels which have been synthesized for this purpose, although it is to be understood that the scope of the present invention is intended to include coating compositions wherein an organic polymer microgel is employed in combination with the inorganic microparticles in the composition.

A particular advantage of the compositions of the present invention is that they have enhanced stability upon heat aging. For example, pigmented, high-solids compositions of the present invention can be stored at 140° F. (60° C.) for at least as long as 3 days and still provide cured coatings exhibiting excellent pigment orientation in the cured film. In particular, high-solids coating compositions of the invention containing metallic flake pigments, such as nonleafing aluminum flakes, can be stored at 140° F. (60° C.) for at least 3 days and still provide excellent pattern control as evidenced by an excellent lightness (or brightness) of face when viewed from a direction essentially normal to the surface of the cured coating and by an excellent two tone appearance when viewed from different angles to a direction normal to the surface of the cured coating.

Some further advantages of the invention may obtain because of the nature of the inorganic microparticles. Being substantially inorganic, the microparticles are inherently more resistant to degradation from the action of ultraviolet light as from exposure to sunlight, from hydrolysis, and from extreme conditions such as high temperature and salt spray. Moreover, the inorganic microparticles are not subject to internal attack by organic solvents and do not swell in the presence of organic solvents.

In summary, high-solids compositions of the invention can be utilized to provide not only excellent rheological properties such as excellent sag control during heat curing, but also can provide excellent pattern control even after heat aging. Moreover, these benefits can be obtained while still achieving a very high degree of gloss in coatings applications requiring high gloss films as for example in automotive coatings.

The following examples are intended to further illustrate the present invention. As used in the body of the specification, examples and claims, all percents, ratios and parts are by weight unless otherwise specifically indicated. Whenever used herein "pbw" means "parts by weight."

EXAMPLE 1

This example illustrates the preparation of a colloidal silica in dipropyleneglycol monomethylether of the type suitable as a starting material for preparation of the dispersion of colloidal silica of Example 2 infra having carbon-containing molecules chemically bonded to the surface of the silica microparticles.

A 12 liter flask is equipped for vacuum distillation, the apparatus including a mechanical stirrer, heating mantle, addition funnel, pot thermometer, and vacuum take-off head containing a thermometer and a condenser.

The flask is charged with 5600 g of dipropyleneglycol monomethylether (DOWANOL DPM from DOW Chemical Company).

To the contents of the flask is added 6118 g of aqueous colloidal silica (NALCOAG 1034A, having a silica solids content of 35.3 percent by weight and a pH of about 3). Distillate containing water is removed under a vacuum of 45 torr while the temperature of the contents of the flask rises from 44° C. to 95° C. during which time essentially all of the water in the flask is distilled off. The resulting dispersion of colloidal silica in dipropyleneglycol monomethylether has a content of silica solids of 30.8 percent by weight, a residual water content of 0.27 percent by weight, and a low viscosity (12.4 seconds, No. 4 Ford Cup).

EXAMPLE 2

A dispersion of colloidal silica in dipropylene glycol monomethylether which is essentially free of water and which has a silica solids content of 32 percent by weight is prepared according to the procedure described in EXAMPLE 1.

A 5 liter flask equipped for distillation is charged with 2812.5 grams of the dispersion of colloidal silica (32 percent by weight silica solids) and 600 grams of n-decyl alcohol. The contents of the flask are heated and held at reflux under atmospheric pressure for about 2 hours during which time the temperature of the contents of the flask gradually rises to 207° C. and 1931 grams of distillate is removed. The resulting product is a colloidal silica having n-decyloxy groups bound to the silica surface. To the resulting product is added 1900 grams of methylamyl ketone to reduce the silica solids content of the flask to 26.6 percent by weight.

EXAMPLE 3

This example illustrates a coating composition of the invention (3B) prepared using the dispersion of colloidal silica of Example 2 and also the excellent performance of the composition after heat aging.

Two high solids, blue metallic coating compositions herein designated 3A (comparative composition) and 3B are prepared by mixing under agitation the ingredients in the amounts in parts by weight set forth in the following TABLE 1.

TABLE 1

| Composition | 3A | 3B |
|---|---|---|
| Ultraviolet light absorber[1] | 3.0 | 3.0 |
| Methylamyl ketone | 45.7 | 40.0 |
| Colloidal silica dispersion[2] | 28.1 | — |
| Colloidal silica dispersion[3] | — | 33.8 |
| Acrylic resin[4] | 83.0 | 83.0 |
| Crosslinking agent[5] | 74.6 | 74.6 |
| Methanol | 9.0 | 9.0 |
| Blue pigment paste[6] | 16.5 | 16.5 |
| Catalyst composition[7] | 3.0 | 3.0 |

[1] A derivative of hydroxyphenyl benzotriazole available as TINUVIN 328 from Geigy Industrial Chemicals.
[2] A dispersion of colloidal silica in dipropyleneglycol monomethylether prepared in the manner described in Example 1 but having a silica solids content of 32 percent by weight.
[3] The dispersion of colloidal silica as described in Example 2.
[4] A high-solids acrylic resin at 75 percent by weight acrylic resin solids in ethyleneglycol monomethylether acetate available as AT-400-CA from Rohm and Haas Company.
[5] A methylated and butylated melamine crosslinking agent available as CYMEL 1130 from American Cyanamid Company.
[6] A composition prepared from 23.75 pbw of nonleafing aluminum flakes, 1.25 pbw of Monarch Blue Pigment from Ciba Geigy Corporation, 25 pbw of an iminated acrylic grinding resin, and 50 pbw of solvent comprising methylamyl ketone, mineral spirits, Naphtholite ®, isobutanol and toluene.
[7] A mixture of 55 percent by weight of dinonylnaphthalene disulfonic acid in isobutanol of which 50 mole percent of the acid groups have been neutralized with diisopropanol amine is combined with sufficient isopropanol and water to produce the catalyst composition containing 30.0 percent by weight dinonylnaphthalene disulfonic acid, 7.5 percent by weight diisopropanol amine, and 62.5 percent by weight solvents (52.58 percent isopropanol, 39.27 percent isobutanol, and 8.15 percent water).

A total of 4 sets of coated steel panels are prepared from Compositions 3A and 3B as follows. Compositions 3A and 3B both shortly after preparation and after aging for 3 days at 140° F. (60° C.) are reduced to a No. 4 Ford Cup viscosity of 21–22 seconds with methylamyl ketone and spray applied to unprimed steel panels using conventional spraying equipment. The spray applied coatings are cured at 250° F. (121° C.) for 30 minutes. The spray applied coatings show very good to excellent resistance to sag during curing and the cured films show very good to excellent metallic-flake orientation (pattern control) as determined visually. However, the set of steel panels having the spray applied coatings prepared from Composition 3A after aging at 140° F. (60° C.) for 3 days show somewhat poorer resistance to sag and somewhat poorer metallic-flake orientation than the other 3 sets of coated steel panels.

Additionally, the percent by weight spray solids after reduction with methylamyl ketone, 20° gloss, distinctness of image (DOI), and dry film thickness (DFT) in mils are determined for the cured coatings on the panels in each of the four sets described immediately above with the results as set forth in the following TABLE 2.

TABLE 2

| | Percent Spray Solids | 20° Gloss | DOI | DFT (mils) |
|---|---|---|---|---|
| Composition 3A (sprayed shortly after preparation) | 54.9 | 59–61 | 19.0 | 2.05 |
| Composition 3A (sprayed after 3 days at 140° F.) | 49.9 | 51–52 | 14.5 | 2.05 |
| Composition 3B (sprayed shortly after preparation) | 55.9 | 62–64 | 32.8 | 2.15 |
| Composition 3B (sprayed after 3 days at 140° F.) | 52.2 | 63–64 | 38.0 | 2.15 |

The above example illustrates that not only does the composition of the invention (3B) provide excellent resistance to sag during cure and excellent metallic-flake orientation (pattern control) in cured coatings while providing excellent gloss and definition of image of the cured films, but that it provides these benefits even after heat aging at 140° F. (60° C.) for 3 days.

EXAMPLE 4

Three hundred grams of an aqueous colloidal silica having a silica solids content of 15 percent by weight and an average particle size of 40 Angstroms, Å (NALCOAG 1115) is diluted with 300 g of distilled water. The resulting diluted dispersion is treated with a strong acid ion exchange resin in the acid form (Amberlite 200 from Rohm and Haas Company) until the pH of the aqueous colloidal silica is lowered to 3. Next, this acidified colloidal silica is treated with a strongly basic ion exchange resin which is in the hydroxide form (Amberlite IRA-900 from Rohm and Haas Company) until the pH is raised to 4. Thereafter, this colloidal silica is further contacted with Amberlite 200 until the pH is lowered to 2.7.

A 1 liter flask is equipped for vacuum distillation as described in Example 1. The flask is charged with 600 g of dipropyleneglycol monomethylether (DOWANOL DPM) and the acidified NALCOAG 1115 (pH of 2.8) is added slowly to the contents of the 1 liter flask as the water is removed under a vacuum of 30 to 40 torr. The vacuum distillation is continued until the temperature of the contents of the flask (pot temperature) reaches 99° C. and the vapor temperature (head temperature) is 81° C. so as to ensure that essentially all the water is removed from the flask. Thereafter, the contents of the flask are cooled to 20° C. whereupon 255 g of n-decyl alcohol (available as EPAL 10 from Ethyl Corporation) is added to the contents of the flask. Next, the contents of the flask are heated to reflux and held at 167° to 190° C. for 2 hours. After this reflux period, distillate is removed until 630 g of distillate is collected and the pot temperature reaches 222° C. at which point heating is discontinued and the contents of the flask are allowed to cool. After cooling, 200 g of methylamyl ketone is added to the contents of the flask. The resulting dispersion of colloidal silica has a silica solids content of 11.8 percent by weight as measured by heating a sample of the colloidal dispersion for 24 hours at 250° F.

EXAMPLE 5

A 1 liter flask is equipped for vacuum distillation as described in EXAMPLE 1.

An aqueous colloidal silica having a silica solids content of 15 percent by weight and an average silica particle size of 40 Angstroms, Å (NALCOAG 1115) is treated with a strong acid ion exchange resin in the acid form (Amberlite 200 from Rohm and Haas Company) until the pH of the aqueous colloidal silica is lowered to 3.0. Next this acidified colloidal silica is treated with a strongly basic ion exchange resin which is in the hydroxide form (Amberlite IRA-900 from Rohm and Haas Company) until the pH is raised to 5. Thereafter, this colloidal silica is further contacted with the Amberlite 200 until the pH is lowered to 2.8. These multiple ion exchange steps are similar to those described in U.S. Pat. No. 3,855,145.

Next, 630 g of the ion exchanged, aqueous colloidal silica having a pH of 2.8 is slowly added to the 1 liter flask which contains 630 g of dipropyleneglycol monomethylether (DOWANOL DPM). The pot temperature is maintained at 45°–50° C. during the addition of the ion exchanged, aqueous colloidal silica to the dipropyleneglycol monomethylether. Thereafter, water is distilled off under a vacuum of 40 torr while the pot temperature rises to 71° C. and the vapor temperature (head temperature) rises to 54° C. A total of 586 g of distillate is recovered. The resulting dispersion of colloidal silica in dipropyleneglycol monomethylether has a silica solids content of 12.8 percent by weight and a residual water content of 1.08 percent by weight.

EXAMPLE 6

This example illustrates a coating composition of the invention (6A) prepared using the dispersion of colloidal silica of Example 4 and also the excellent performance of the composition after heat aging.

Two high-solids metallic coating compositions herein designated Compositions 6A and 6B (comparative composition) are prepared by mixing under agitation the ingredients in the amounts in parts by weight as set forth in the following TABLE 3.

TABLE 3

| Composition | 6A | 6B |
|---|---|---|
| Ultraviolet light absorber[1] | 3.0 | 3.0 |
| Methylamyl ketone | 29.6 | 33.5 |
| Colloidal silica dispersion[2] | 38.1 | — |
| Colloidal silica dispersion[3] | — | 35.2 |
| Acrylic resin[4] | 94.5 | 94.5 |
| Crosslinking agent[5] | 74.6 | 74.6 |
| Methanol | 9.0 | 9.0 |
| Aluminum pigment paste[6] | 6.0 | 6.0 |
| Catalyst composition[7] | 3.0 | 3.0 |

[1]As described in footnote 1 to Table 1.
[2]The dispersion of colloidal silica having a silica solids content of 11.8 percent by weight as described in Example 4.
[3]The dispersion of colloidal silica in dipropyleneglycol monomethylether having a silica solids content of 12.8 percent by weight as described in Example 5.
[4]As described in footnote 4 to Table 1.
[5]As described in footnote 5 to Table 1.
[6]A dispersion of non-leafing aluminum flakes at 65 percent by weight solids in mineral spirits available as Aluminum Paste R167 from Ohio Bronze Powder Company.
[7]As described in footnote 7 to Table 1.

A total of 4 sets of coated steel panels are prepared from Compositions 6A and 6B as follows. Compositions 6A and 6B both shortly after preparation and after aging for 3 days at 140° F. (60° C.) are reduced to a No. 4 Ford Cup viscosity of 21–22 seconds with methylamylketone and spray applied to unprimed steel panels using conventional spraying equipment. The spray applied coatings are cured at 250° F. (121° C.) for 30 minutes. The spray applied coatings show very good to excellent resistance to sag during curing and the cured films show very good to excellent metallic-flake orientation (pattern control) as determined visually. However, the set of steel panels having the spray applied coatings prepared from Composition 6B after aging at 140° F. (60° C.) for 3 days show somewhat poorer resistance to sag and somewhat poorer metallic-flake orientation than the other 3 sets of coated steel panels.

Additionally, the percent by weight spray solids after reduction with methylamyl ketone, 20° gloss, distinctness of image (DOI), and dry film thickness (DFT) in mils are determined for the cured coatings on the panels in each of the four sets described immediately above with the results as set forth in the following TABLE 4.

TABLE 4

|  | Percent Spray Solids | 20° Gloss | DOI | DFT (mils) |
|---|---|---|---|---|
| Composition 6A (sprayed shortly after preparation) | 53.3 | 63 | 24.3 | 1.95 |
| Composition 6A (sprayed after 3 days at 140° F.) | 48.7 | 67 | 35.3 | 2.0 |
| Composition 6B (sprayed shortly after preparation) | 50.5 | 43 | 7.1 | 1.75 |
| Composition 6B (sprayed after 3 days at 140°0 F.) | 47.0 | 35 | 5.1 | 1.9 |

The above example illustrates that not only does the composition of the invention (6A) provide excellent resistance to sag during cure and excellent metallic-flake orientation (pattern control) in cured coatings while providing excellent gloss and definition of image of the cured films, but that it provides these benefits even after heat aging at 140° F. (60° C.) for 3 days.

EXAMPLE 7

A 5 liter, 4-neck flask equipped with a stirrer, thermometer, and distillation take-off is charged with 2039 grams of methanol, 220 grams of distilled water, and 216.6 grams of an aqueous solution containing 30 percent by weight ammonia. The resulting solution is heated to reflux and when the concentration of ammonia in the solution is 0.71 molar, a mixture of 504.7 grams of ethyl, silicate, condensed, from Union Carbide Corporation (believed to contain about 90 percent by weight tetraethylorthosilicate and about 10 percent by weight of hexaethoxydisiloxane) and 21.0 grams of octyltriethoxysilane is added all at once with vigorous stirring.

Next, the contents of the flask are refluxed for two hours and thereafter allowed to cool to room temperature.

Next, 1045 grams of a distillate containing methanol and ammonia is removed from the flask by vacuum distillation at 50 torr pressure and 23° C.

Next, 300 milliliters of 1-methoxy-2-propanol (DOWANOL PM from DOW Chemical Company) is added to the contents of the flask and the dispersion is thereafter acidified from a pH of 8.9 to a pH of 2.26 by the addition of 10 ml of concentrated hydrochloric acid (12 Molar). To the acidified colloidal dispersion is added 1000 ml of 1-methoxy-2-propanol (DOWANOL PM).

Next, essentially all of the remaining methanol and water in addition to some of the 1-methoxy-2-propanol are removed by azeotropic distillation at a pressure of 45 torr and a temperature of 59° C. During the aforesaid azeotropic distillation a total of 2425 g of distillate is removed from the flask. The resulting product is a stable dispersion of colloidal silica in 1-methoxy-2-propanol having a silica solids content of 19.7 percent by weight.

EXAMPLE 8

A 5 liter, 4-neck flask is equipped with a stirrer, thermometer, condenser, and distillation take-off.

In the 5 liter flask are mixed 2402 g of methanol, 460 g of distilled water, and 156.1 g of an aqueous solution containing 30 percent by weight ammonia. The resulting solution is heated to reflux and when the concentration of ammonia in the solution is 0.65 molar, 532 g of ethylsilicate, condensed, from Union Carbide Corporation (believed to contain about 90 percent by weight tetraethylorthosilicate and about 10 percent by weight of hexaethoxydisiloxane) is added to the contents of the flask all at once with vigorous stirring. The contents of the flask turns milky 4 minutes after the addition of the ethylsilicate, condensed, to the flask.

Next, the contents of the flask are refluxed for two hours and thereafter allowed to cool to room temperature.

Next, 1695 g of a distillate containing methanol and ammonia is removed from the flask by vacuum distillation at 90 torr and 32° C.

The dispersion remaining in the flask is then acidified from a pH of 8.44 to a pH of 2.40 by the addition of 8 milliliters (ml) of concentrated hydrochloric acid (12 Molar). To the acidified colloidal dispersion is added 1200 ml of 1-methoxy-2-propanol (DOWANOL PM from DOW Chemical Company).

Next, essentially all of the remaining methanol and water in addition to some of the 1-methoxy-2-propanol are removed by azeotropic distillation at a pressure of 45 torr. Thereafter, further concentration of the colloidal dispersion by vacuum distillation at 45 torr and 62° C. results in a stable dispersion of colloidal silica in 1-methoxy-2-propanol having a silica solids content of 24.2 percent by weight. During the aforesaid azeotropic distillation and further concentration at 45 mm torr, a total of 1994.5 g of distillate is removed from the flask.

EXAMPLE 9

This example illustrates a coating composition of the invention (9A) prepared using the dispersion of colloidal silica of Example 7 and also the excellent performance of the composition after heat aging.

Two high-solids, silver metallic coating composition herein designated Compositions 9A and 9B (comparative composition) are prepared by mixing under agitation the ingredients in the amounts in parts by weight as set forth in the following TABLE 5.

TABLE 5

| Composition | 9A | 9B |
|---|---|---|
| Ultraviolet light absorber[1] | 3.0 | 3.0 |
| Methylamyl ketone | 33.8 | 42.8 |
| Colloidal silica dispersion[2] | 37.9 | — |
| Colloidal silica dispersion[3] | — | 31.0 |
| Acrylic resin[4] | 90.5 | 90.5 |
| Crosslinking agent[5] | 74.6 | 74.6 |
| Methanol | 9.0 | 9.0 |
| Aluminum: pigment paste[6] | 6.0 | 6.0 |

TABLE 5-continued

| Composition | 9A | 9B |
|---|---|---|
| Catalyst composition[7] | 3.0 | 3.0 |

[1] As described in footnote 1 to Table 1.
[2] The dispersion of colloidal silica in 1-methoxy-2-propanol having a silica solids content of 19.7 percent by weight as described in Example 7.
[3] The dispersion of colloidal silica in 1-methoxy-2-propanol having a silica solids content of 24.2 percent by weight as described in Example 8.
[4] As described in footnote 4 to Table 1.
[5] As described in footnote 5 to Table 1.
[6] As described in footnote 6 to Table 3.
[7] As described in footnote 7 to Table 1.

A total of 4 sets of coated steel panels are prepared from Compositions 9A and 9B as follows. Compositions 9A and 9B both shortly after preparation and after aging for 3 days at 140° F. (60° C.) are reduced to a No. 4 Ford Cup viscosity of 21–22 seconds with methylamylketone and spray applied to unprimed steel panels using conventional spraying equipment. The spray applied coatings are cured at 250° F. (121° C.) for 30 minutes. The spray applied coatings show very good to excellent resistance to sag during curing and the cured films show very good to excellent metallic-flake orientation (pattern control) as determined visually. However, the set of steel panels having the spray applied coatings prepared from Composition 9B after aging at 140° F. (60° C.) for 3 days show somewhat poorer resistance to sag and somewhat poorer metallic-flake orientation than the other 3 sets of coated steel panels.

Additionally, the percent by weight spray solids after reduction with methylamylketone, 20° gloss, distinctness of image (DOI), and dry film thickness (DFT) in mils are determined for the cured coatings on the panels in each of the four sets described immediately above with the results as set forth in the following TABLE 6.

TABLE 6

| | Percent Spray Solids | 20° Gloss | DOI | DFT (mils) |
|---|---|---|---|---|
| Composition 9A (sprayed shortly after preparation) | 56.3 | 62 | 20.8 | 2.0 |
| Composition 9A (sprayed after 3 days at 140° F.) | 50.4 | 64 | 26.6 | 2.05 |
| Composition 9B (sprayed shortly after preparation) | 54.9 | 55–56 | 11.0 | 2.05 |
| Composition 9B (sprayed after 3 days at 140° F.) | 48.4 | 35–37 | 4.8 | 2.05 |

The above example illustrates that not only does the composition of the invention (9A) provide excellent resistance to sag during cure and excellent metallic flake orientation in cured coatings while providing excellent gloss and definition of image of the cured films, but that it provides these benefits even after heat aging at 140° F. (60° C.) for 3 days.

EXAMPLE 10

A grinding apparatus consisting of a ball mill jar rotated by a pair of rollers and containing solid, ceramic, Burundum cylinders that range in length from about ½ to about ¾ inch in length and from about ⅜ to about ¾ inch in diameter is charged with 252 grams of a fumed silica having a surface area of approximately 200 square meters per gram (available as CAB-O-SIL PTG from Cabot Corporation) and 748 grams of dipropyleneglycol monomethylether (DOWANOL DPM). The fumed silica is ground in the dipropyleneglycol monomethylether for 64 hours. The resulting composition has a silica solids content of 23.6 percent by weight as determined at 250° F. (121° C.) for 2 hours.

EXAMPLE 11

The ground fumed silica having a silica solids content of 23.6 percent by weight of Example 10 in an amount of 550 grams is mixed with 120 grams of n-decyl alcohol (available as EPAL 10 from Ethyl Corporation) in a 1 liter flask equipped for distillation at ambient atmospheric pressure. The contents of the flask are heated from 20° C. to 182° C. over a period of 45 minutes after which the temperature is held in the range of from 182° C. to 193° C. for 1½ hours and then allowed to rise over a period of 1 hour and 40 minutes to a temperature of 206° C. at which point heating is discontinued. A total of 346 grams of distillate is recovered during the distillation. The resulting product is a dispersion of silica having a chemically modified surface and has a silica solids content of 25.1 percent by weight as measured at 250° F. (121° C.) for 24 hours.

EXAMPLE 12

This example illustrates a coating composition of the invention (12B) prepared from the dispersion of silica of Example 11.

Two high-solids, silver metallic coating compositions herein designated 12A (comparative composition) and 12B are prepared by mixing under agitation the ingredients in the amounts in parts by weight as set forth in the following TABLE 7.

TABLE 7

| Composition | 12A | 12B |
|---|---|---|
| Ultraviolet light absorber[1] | 3.0 | 3.0 |
| Methylamyl ketone | 31.3 | 30.0 |
| Silica dispersion[2] | 44.5 | — |
| Silica dispersion[3] | — | 47.8 |
| Acrylic resin[4] | 86.5 | 84.5 |
| Crosslinking agent[5] | 74.6 | 74.6 |
| Methanol | 9.0 | 9.0 |
| Aluminum pigment paste[6] | 6.0 | 6.0 |
| Catalyst composition[7] | 3.0 | 3.0 |

[1] As described in footnote 1 to Table 1.
[2] The dispersion of silica having a silica solids content of 23.6 percent by weight as described in Example 10.
[3] The dispersion of silica solids content of 25.1 percent by weight as described in Example 11.
[4] As described in footnote 4 to Table 1.
[5] As described in footnote 5 to Table 1.
[6] As described in footnote 6 to Table 3.

A total of 4 sets of coated steel panels are prepared from Compositions 12A and 12B as follows. Compositions 12A and 12B both shortly after preparation and after aging for 3 days at 140° F. (60° C.) are reduced to a No. 4 Ford Cup viscosity of 21–22 seconds with methylamyl ketone and spray applied to unprimed steel panels using conventional spraying equipment. The spray applied coatings are cured at 250° F. (121° C.) for 30 minutes. The spray applied coatings show good to excellent resistance to sag during curing and the cured films show good to excellent metallic-flake orientation (pattern control) as determined visually.

The percent by weight spray solids after the reduction with methylamyl ketone, 20° gloss, distinctness of image (DOI), and dry film thickness (DFT) in mils are determined for the cured coatings on the panels in each of the four sets described immediately above with the results as set forth in the following TABLE 8.

TABLE 8

| | Percent Spray Solids | 20° Gloss | DOI | DFT (mils) |
|---|---|---|---|---|
| Composition 12A (sprayed shortly after preparation) | 49.0 | 32–37 | 0.8 | 1.6–1.7 |
| Composition 12A (sprayed after 3 days at 140° F.) | 46.8 | 43–44 | 3.0 | 1.7 |
| Composition 12B (sprayed shortly after preparation) | 53.3 | 64–66 | 18 | 1.9–2.0 |
| Composition 12B (sprayed after 3 days at 140° F.) | 50.7 | 64–65 | 25.2 | 2.0 |

The above example illustrates that not only does the composition of the invention (12B) containing the pyrogenic silica chemically modified by n-decyl alcohol provide excellent resistance to sag and very good metallic flake orientation (pattern control), but that the cured films prepared from the composition of the invention exhibit much better gloss and definition of image than those prepared from the comparative composition 12A both before and after the compositions are heat aged.

It is also noteworthy that the composition of the invention (12B) provides better stability against changes in gloss in cured films prepared from the composition after the heat aging as compared to the comparative composition (12A).

What is claimed is:

1. An essentially solvent-based, organic, high-solids coating composition which is conventionally sprayable at high-solids comprising:
   (A) a film-forming binder system containing a crosslinkable resin having a weight average molecular weight of from about 500 to about 10,000, and optionally a crosslinking agent for the crosslinkable resin:
   (B) substantially colorless, substantially inorganic microparticles stably dispersed in the coating composition, the microparticles prior to incorporation in the coating composition ranging in size from about 1 to about 150 nanometers and in the form of a sol of the microparticles in which carbon-containing molecules are chemically bonded to the surface of the inorganic microparticles; and
   (C) a solvent system for the crosslinkable resin and the optional crosslinking agent;
   wherein the crosslinkable resin is in an amount of from about 15 to about 95 percent by weight and the substantially inorganic microparticles are in an amount of from about 1 to about 20 percent by weight, based on the sum of the weights of the crosslinkable resin, the optional crosslinking agent, and the inorganic microparticles.

2. The coating composition of claim 1 wherein the microparticles comprise silica.

3. The coating composition of claim 2 wherein the sol is an organosol.

4. The coating composition of claim 1 wherein the microparticles prior to incorporation in the coating composition range in size from about 1 to about 100 nanometers.

5. The coating composition of claim 1 wherein the microparticles prior to incorporation in the coating composition range in size from about 3.5 to about 50 nanometers.

6. The coating composition of claim 3 wherein the silica has been incorporated in an alcohol in the form of a stable colloidal dispersion of the silica in the alcohol.

7. The coating composition of claim 6 wherein the alcohol is selected from a monohydric alcohol, a polyol or a mixture thereof.

8. The coating composition of claim 6 wherein the silica has been treated by heating the silica in the presence of a monohydric alcohol, a polyol, or a mixture thereof at a temperature of at least 180° C.

9. The coating composition of claim 3 wherein the silica has thereon a surface-bonded organic compound formed by reaction of surface silanol moieties of the silica with an organic compound having a functional group reactive with the silanol moiety.

10. The coating composition of claim 9 wherein the organic compound is selected from a monohydric alcohol, a polyol, or a mixture thereof.

11. The coating composition of claim 9 wherein the surface-bonded organic compound is present in an amount sufficient to make the surface of the silica hydrophobic.

12. The coating composition of claim 1 wherein the microparticles comprise silica prepared from the hydrolysis of a compound selected from the group consisting of a tetraalkylorthosilicate, an alkoxypolysiloxane, an alkylalkoxysilane, and a mixture thereof, in the presence of a base in a medium of pH greater than 7.0.

13. The coating composition of claim 12 wherein the silica is prepared from the hydrolysis of a mixture of a tetraalkylorthosilicate and an alkylalkoxysilane.

14. The coating composition of claim 1 which is conventionally sprayable at a solids content of at least 40 percent by weight of the composition.

15. The coating composition of claim 2 wherein the amount of the silica in the coating composition ranges from about 1 to about 20 percent by weight based on the sum by weight of the crosslinkable resin, optional crosslinking agent, and the silica.

16. The coating composition of claim 1 additionally comprising organic polymeric microparticles which are insoluble in the solvent system and which have a diameter in the range of from about 0.01 to about 40 microns.

17. An essentially solvent-based, organic, high-solids coating composition which is conventionally sprayable at high-solids comprising:
   (A) a film-forming binder system containing a crosslinkable resin having a weight average molecular weight of from about 500 to about 10,000, and optionally a crosslinking agent for the crosslinkable resin;
   (B) substantially colorless, substantially inorganic, microparticles stably dispersed in the coating composition, the microparticles prior to incorporation in the coating composition ranging in size from about 1 to about 150 nanometers and in the form of a sol of the microparticles in which carbon-containing molecules are chemically bonded to the surface of the inorganic microparticles;
   (C) a solvent system for the crosslinkable resin and the optional crosslinking agent; and
   (D) a metallic-flake pigment;
   wherein the crosslinkable resin is in an amount of from about 15 to about 95 percent by weight and the substantially inorganic mircoparticles are in an amount of from about 1 to about 20 percent by weight, based on the sum of the weights of the crosslinkable resin, the optional crosslinking agent, and the inorganic microparticles.

18. The coating composition of claim 17 wherein the microparticles comprise silica.

19. The coating composition of claim 18 wherein the metallic-flake pigment comprises aluminum flakes.

20. The coating composition of claim 18 wherein the sol is an organosol.

21. The coating composition of claim 17 wherein the microparticles prior to incorporation in the coating composition range in size from about 1 to about 100 nanometers.

22. The coating composition of claim 17 wherein the microparticles prior to incorporation in the coating composition range in size from about 3.5 to about 50 nanometers.

23. The coating composition of claim 18 wherein the amount of crosslinkable resin plus crosslinking agent ranges from about 80 to about 99 percent by weight, and the amount of silica ranges from about 1 to about 20 percent by weight, both percentages being based on the sum by weight of crosslinkable resin, crosslinking agent and silica.

24. The coating composition of claim 17 which is conventionally sprayable at a solids content of at least 40 percent by weight of the coating composition.

25. The coating composition of claim 17 additionally comprising organic polymeric microparticles which are insoluble in the solvent system and which have a diameter in the range of from about 0.01 to about 40 microns.

26. A substrate coated with the coating composition of claim 1.

27. A substrate coated with the coating composition of claim 2.

28. A substrate coated with the coating composition of claim 15.

29. A substrate coated with the coating composition of claim 18.

30. A substrate coated with the coating composition of claim 19.

* * * * *